(12) United States Patent
Aoki

(10) Patent No.: US 10,802,272 B2
(45) Date of Patent: Oct. 13, 2020

(54) VEHICULAR DISPLAY APPARATUS

(71) Applicant: Yazaki Corporation, Tokyo (JP)

(72) Inventor: Kunimitsu Aoki, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 124 days.

(21) Appl. No.: 16/044,633

(22) Filed: Jul. 25, 2018

(65) Prior Publication Data

US 2019/0033584 A1 Jan. 31, 2019

(30) Foreign Application Priority Data

Jul. 26, 2017 (JP) ................... 2017-144486

(51) Int. Cl.
*G02B 27/01* (2006.01)
*G02B 5/08* (2006.01)
*B60K 37/02* (2006.01)

(52) U.S. Cl.
CPC .......... *G02B 27/0101* (2013.01); *B60K 37/02* (2013.01); *G02B 5/0816* (2013.01); *G02B 27/0172* (2013.01); *B60K 2370/334* (2019.05); *G02B 27/0149* (2013.01); *G02B 2027/0125* (2013.01); *G02B 2027/0145* (2013.01)

(58) Field of Classification Search
CPC ............ G02B 27/0101; G02B 27/0172; G02B 27/0149; G02B 5/0816; G02B 2027/0125; G02B 2027/0145; B60K 37/02; B60K 2370/334

USPC ........................................................ 359/630
See application file for complete search history.

(56) References Cited

U.S. PATENT DOCUMENTS 5,278,532 A 1/1994 Hegg et al.
2013/0063754 A1* 3/2013 Saisho ................. G02B 5/0257
358/1.13

FOREIGN PATENT DOCUMENTS

JP 02-501238 A 4/1990
JP 2009-014962 A 1/2009

* cited by examiner

*Primary Examiner* — Thomas K Pham
*Assistant Examiner* — Mitchell T Oestreich
(74) *Attorney, Agent, or Firm* — Sughrue Mion, PLLC

(57) ABSTRACT

A vehicular display apparatus includes a display device, a magnifying mirror, and a turning back mirror. The display device emits display light corresponding to a display image to be visually recognized by a driver on a vehicle. The magnifying mirror reflects the display light to project the display image on a windshield of the vehicle. The turning back mirror is disposed on an optical path between the display device and the magnifying mirror and has a concave reflecting surface that reflects the display light. The magnifying mirror has the magnifying power that is set higher than that of the turning back mirror.

6 Claims, 2 Drawing Sheets

VEHICULAR DISPLAY APPARATUS

CROSS-REFERENCE TO RELATED APPLICATION(S)

The present application claims priority to and incorporates by reference the entire contents of Japanese Patent Application No. 2017-144486 filed in Japan on Jul. 26, 2017.

BACKGROUND OF THE INVENTION

1. Field of the Invention

The present invention relates to a vehicular display apparatus.

2. Description of the Related Art

In recent years, some vehicles such as automobiles have been equipped with a vehicular display apparatus, for example, a head up display (HUD). Some vehicular display apparatuses allow a driver to visibly recognize a virtual image, for example, by returning display light emitted from the display device by using a plane mirror to enter the display light to a concave mirror, and then reflecting the display light by the concave mirror to project the display light on a windshield.

For example, an image display apparatus that displays a virtual image is disclosed in Japanese Patent Application Laid-open No. 2009-14962. The image display apparatus includes a projector that images a real image of a display image on a convex screen, and a concave mirror that forms a virtual image of the real image of the display image that is imaged on the convex screen. Furthermore, a real image display apparatus for automotive devices is disclosed in Japanese Patent Application Laid-open No. H02-501238. The real image display apparatus employs an aspherical mirror to image a real image corresponding to a display image for automotive instrument, at the position of a distance of field of view greater than a distance between a driver and an instrument panel.

In HUDs, for example, a thin film transistor-liquid crystal display (TFT-LCD) in a display device has been manufactured in a ready-made size and thus further downsizing is difficult. Therefore, downsizing by improving an optical system such as a reflecting mirror or a magnifying mirror has been expected instead.

SUMMARY OF THE INVENTION

It is an object of the present invention to provide a vehicular display apparatus that can be easily downsized.

A vehicular display apparatus according to one aspect of the present invention includes a display device that emits display light corresponding to an display image to be visually recognized by a driver on a vehicle; a first reflecting mirror that reflects the display light to project, on a windshield of the vehicle, the display image; and a second reflecting mirror disposed on an optical path between the display device and the first reflecting mirror, and having a concave reflecting surface that reflects the display light, wherein the first reflecting mirror has magnifying power that is set higher than magnifying power of the second reflecting mirror, and when a distance between the second reflecting mirror and the display device is a and a focal distance of the second reflecting mirror is f, the second reflecting mirror is disposed at a position that satisfies the following expression: a>2f relative to the display device (11), and the second reflecting mirror images a real image corresponding to the display image on the optical path away from the second reflecting mirror by distance b, at magnification b/a.

According to another aspect of the present invention, in the vehicular display apparatus, it is preferable that the second reflecting mirror has a reflecting surface having a spherical shape or an aspherical shape.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a vehicular display apparatus according to the present invention will be described in detail below with reference to the drawings. Note that, the invention is not limited to the embodiment. Moreover, constituent elements in the embodiment described below may include those can be easily assumed by those who skilled in the art or those are substantially the same. Furthermore, various omissions, substitutions, and modifications may be made to the constituent elements in the embodiment described below, without departing from the scope of the gist pf the invention.

Embodiment

Figure 1:
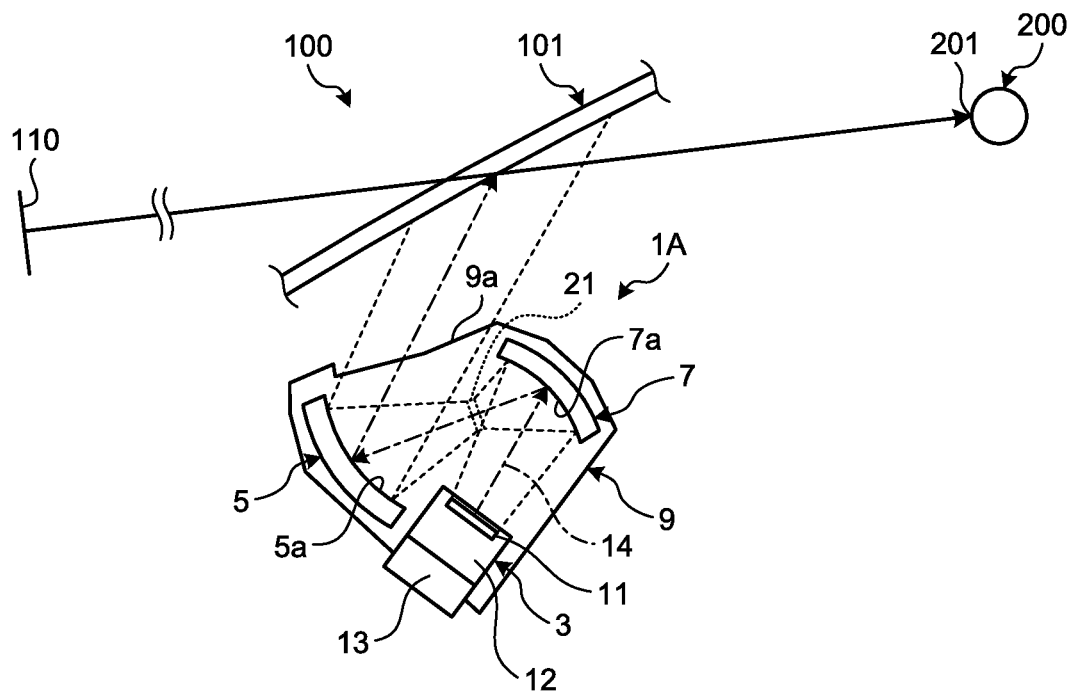
FIG. 1 is an exemplary view illustrating a schematic configuration of a vehicular display apparatus according to an embodiment.
Figure 2:
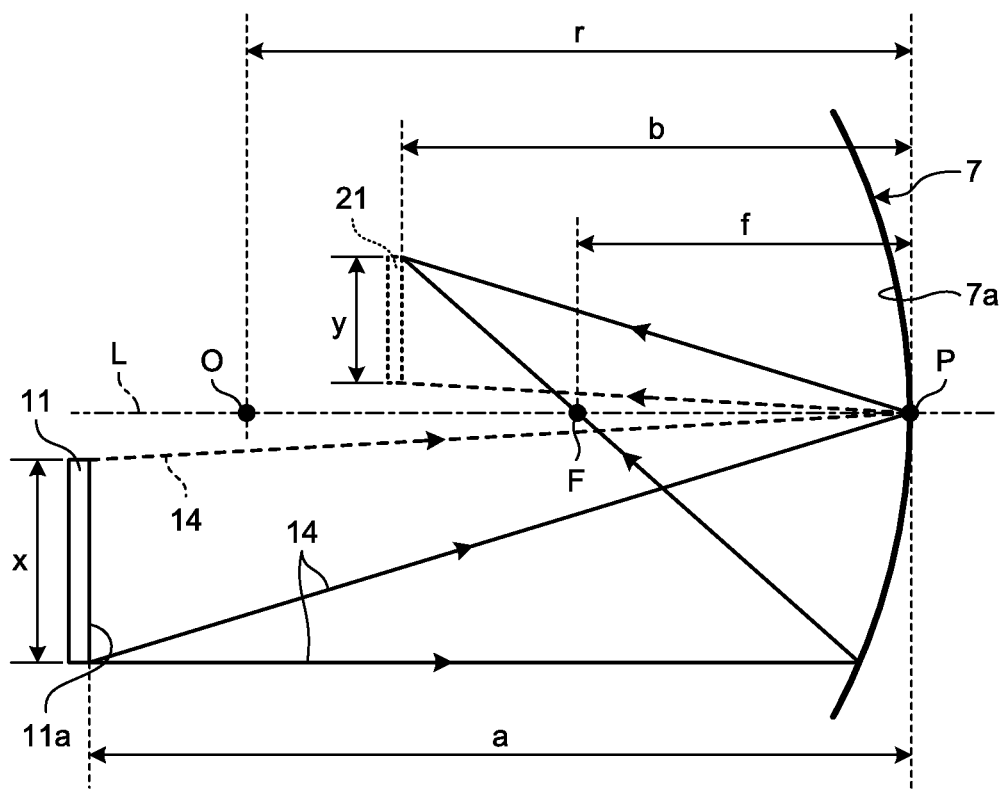
FIG. 2 is an exemplary view illustrating a positional relationship between a turning back mirror and a display device according to the embodiment.
Figure 3:
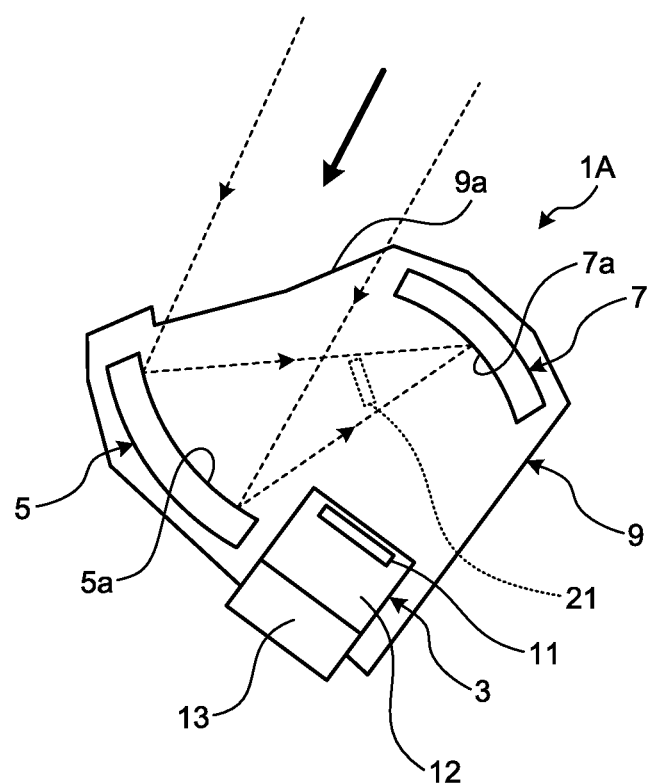
FIG. 3 is an exemplary view explaining an optical path of exterior light entered to the vehicular display apparatus according to the embodiment.

FIG. 1 is an exemplary view illustrating a schematic configuration of a vehicular display apparatus according to an embodiment. FIG. 2 is an exemplary view illustrating a positional relationship between a turning back mirror and a display device according to the embodiment. FIG. 3 is an exemplary view explaining an optical path of exterior light entered the vehicular display apparatus according to the embodiment. Note that, FIG. 1 is the view illustrating a positional relationship between each element when a vehicle equipped with the vehicular display apparatus is seen from the side of the vehicle.

The vehicular display apparatus 1A according to the embodiment is, as illustrated in FIG. 1, for example, a HUD to be equipped on a vehicle 100 such as an auto vehicle. The vehicular display apparatus 1A is provided inside a dashboard (not illustrated) of the vehicle 100 and projects a display image on a windshield 101 of the vehicle 100. The vehicular display apparatus 1A projects the display image on the windshield 101 to display a virtual image 110 ahead of an eyepoint 201. The eyepoint 201 is a visually observing position of a driver 200 seating on a driver seat (not illustrated). The driver 200 recognizes the image reflected by the windshield 101 as a virtual image 110. The virtual image 110 is recognized ahead than the windshield 101, by the driver 200. The vehicular display apparatus 1A includes a display unit 3, a magnifying mirror 5, a turning back mirror 7, and a casing 9.

The display unit 3 emits the display light 14 toward the magnifying mirror 5 via the turning back mirror 7 and then provides the driver 200 with various visual information through a display image by the display light 14 reflected on the magnifying mirror 5. The visual information contains various types of information on the vehicle, for example, information for assisting operation by the driver 200. The display unit 3 is accommodated in the casing 9 such that a portion of the display unit 3 makes contact with air outside the vehicular display apparatus 1A. The display unit 3 includes a display device 11, a backlight 12, and a heat sink 13.

The display device 11 emits the display light 14 corresponding to the display image to be visually recognized by the driver 200. The display device 11 includes, for example, a transmissive or semi-transmissive TFT-LCD. The display device 11 displays a display image containing, for example, a numeric character, a character, or a figure, in response to a control instruction by a controller (not illustrated) equipped on the vehicle 100. The display device 11 has a planer display surface 11a. The display device 11 is provided such that the display surface 11a faces the turning back mirror 7.

The backlight 12 illuminates the display device 11 from the rear side thereof. The backlight 12 includes, for example, a light-emitting diode (LED), a lens array, and a diffusion sheet. The LED is a light source. In the backlight 12, a plurality of LEDs is mounted on the surface (display device 11 side) of a substrate (not illustrated). The lens array is an optical element, for example, formed by planarly arranging a plurality of substantially hemispherical lenses. In the lens array, a protrusion of each lens is protruded toward the display device 11 such that a plane opposed to the protrusion faces the LEDs. Lenses of the lens array each outputs light entered from the LEDs toward the display device 11. The diffusion sheet is formed in a thin-plate shape and interposed between the display device 11 and the lens array. The diffusion sheet diffuses and outputs light entered from the lens array toward the display device 11.

The heat sink 13 is so-called a heat dissipation member. The heat sink 13 is laminated on a rear surface of the substrate to dissipate, to outside the vehicular display apparatus 1A, heat accumulated in the substrate. The heat sink 13 is disposed so as to make contact with air outside the vehicular display apparatus 1A.

The magnifying mirror 5 is a first reflecting mirror. The magnifying mirror 5 is disposed on an optical path of the display light 14 reflected by the turning back mirror 7. The magnifying mirror 5 reflects the display light 14 to project, on a windshield 101 of the vehicle 100, a display image displayed by the display light 14. The magnifying mirror 5 is a concave mirror that magnifies the display image to be projected on the windshield. The magnifying mirror 5 has magnifying power that is set higher than that of the turning back mirror 7 described below. The magnifying mirror 5 preferably has a magnifying power of five to six times; however, the magnifying power is not limited to the numeric values. The magnifying mirror 5 is an aspherical mirror that has a concave and aspherical reflecting surface 5a. The reflecting surface 5a is a part that diffuses and reflects the display light 14 that is entered.

The turning back mirror 7 is a second reflecting mirror. The turning back mirror 7 is disposed on an optical path between the display device 11 and the magnifying mirror 5, and reflects, toward the magnifying mirror 5, the display light 14 emitted from the display device 11. The turning back mirror 7 is disposed at a position facing the display device 11. The turning back mirror 7 is a concave mirror that images a real image 21 for the display image, on the optical path between the display device 11 and the magnifying mirror 5. The turning back mirror 7 is a spherical mirror that has a concave and spherical reflecting surface 7a. The reflecting surface 7a reflects the display light 14 entered from the display device 11 and then images a real image 21 on the optical path.

The casing 9 accommodates various components including the display unit 3, the magnifying mirror 5, and the turning back mirror 7. The casing 9 includes, for example, an insulative resin material. The casing 9 has a transparent cover 9a on a surface facing the windshield 101. The display light 14 reflected by the magnifying mirror 5 is applied to the windshield 101 via the transparent cover 9a.

Next, for the real image 21 to be imaged by the turning back mirror 7, the positional relationship between the turning back mirror 7 and the display device 11 in the vehicular display apparatus 1A will be described with reference to FIG. 2. For the display device 11, the turning back mirror 7 is provided at a position facing the display surface 11a. The turning back mirror 7 is disposed at a position (point P) away from the display surface 11a of the display device 11 by distance a. The turning back mirror 7 is provided at a position of $a>r$ when the reflecting surface 7a is a spherical reflecting surface having radius r using point O as the center of the reflecting surface 7a. The turning back mirror 7 has focal point F between the point O and the point P on reference optical axis L when a principal ray of the display light 14 to be entered to the reflecting surface 7a is the reference optical axis L. Focal distance f from the point P to the focal point F is r/2. The turning back mirror 7 is preferably disposed at a position that satisfies the following expression: $a>2f$, relative to the display device 11, when a distance to the display device 11 is a and a focal distance is f. The turning back mirror 7 reflects the display light 14 emitted from the display device 11 and then images the real image 21 at a position away from the point P by distance b. The real image 21 is smaller than the display image displayed on the display device 11 and is inverted. For example, when a length in a vertical direction of the display image (display device 11) is x and also a length in a vertical direction of the real image 21 is y, the following expression is satisfied: $x>y$. Furthermore, the real image 21 is enlarged in a size of magnification b/a for the display image.

As described above, the vehicular display apparatus 1A according to the present embodiment includes the display device 11, the magnifying mirror 5, and the turning back mirror 7. The display device 11 emits the display light 14 corresponding to the display image to be visually recognized by the driver 200 on the vehicle 100. The magnifying mirror 5 reflects the display light 14 to project the display image on the windshield 101 of the vehicle 100. The turning back mirror 7 is disposed on the optical path between the display device 11 and the magnifying mirror 5 and has the concave reflecting surface 7a that reflects the display light 14. The magnifying mirror 5 has the magnifying power that is set higher than that of the turning back mirror 7. When the distance between the turning back mirror 7 and the display device 11 is a and the focal distance of the turning back mirror 7 is f, for the display device 11, the turning back mirror 7 is disposed at the position that satisfies the following expression: a>2f relative to the display device 11, and the turning back mirror 7 images the real image 21 corresponding to the display image on the optical path away from the turning back mirror 7 by distance b, at the magnification b/a.

According to the vehicular display apparatus 1A having the configuration described above, two concave mirrors (magnifying mirror 5 and turning back mirror 7) are disposed on the optical path of the display light 14. This enables increase in magnifying power and shortening of a projection distance. Therefore, easy downsizing is achieved by thinning the depth of the casing 9. When a HUD is downsized, the projection distance can be shortened by increasing the magnifying power of the magnifying mirror 5; however, the display device 11 needs to be downsized as well. For example, when the dot display of a TFT-LCD is reduced, transmittance will decrease and display quality may degrade. Therefore, the turning back mirror 7 having the concave spherical reflecting surface 7a is configured so as to image, on the optical path of the display light 14, the real image 21 for the display image of the display device 11. Consequently, the magnifying power of the magnifying mirror 5 can be increased and the projection distance can be shortened, without downsizing the display device 11. Moreover, for the turning back mirror 7 that is a plane mirror, when sun light or the like enters via the transparent cover 9a of the casing 9, light condensed by the magnifying mirror 5 returns on the plane mirror and then applied to the display device 11. Consequently, heat generated by the condensed light may cause thermal destruction of the display device 11. As illustrated in FIG. 3, the turning back mirror 7 is the concave mirror. Thus, even when the magnifying power of the magnifying mirror 5 is increased, the condensed light will not be directed to the display device 11 and the display device 11 can be protected. Furthermore, the magnifying mirror 5 has the magnifying power that is set higher than that of the turning back mirror 7, thereby enabling display of a larger image.

Furthermore, the vehicular display apparatus 1A according to the present embodiment, the reflecting surface 7a of the turning back mirror 7 has a spherical shape or an aspherical shape. When the reflecting surface 7a of the turning back mirror 7 is in a spherical shape, manufacturing cost can be reduced. When the reflecting surface 7a of the turning back mirror 7 is in an aspherical shape, display distortion correction or aberration correction can be corrected, thereby improving the quality of display images.

Modification

Figure 4:
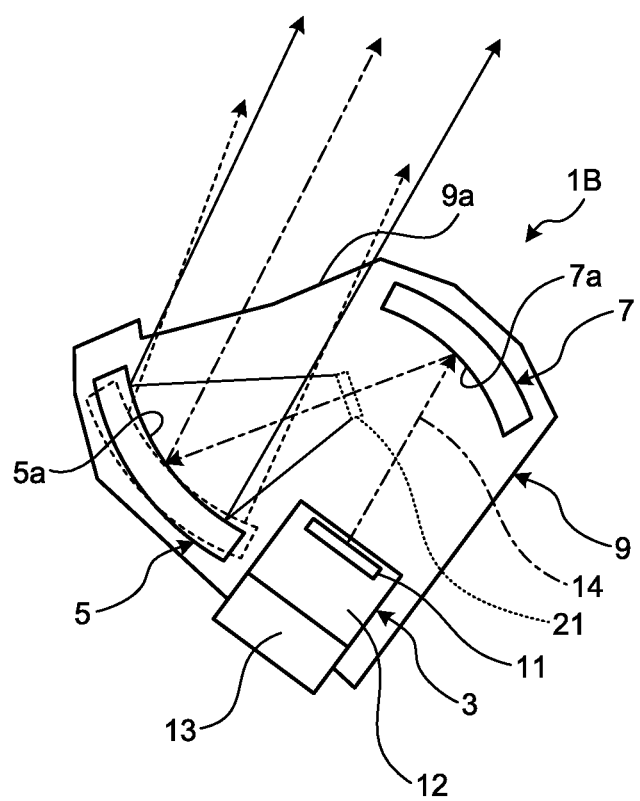
FIG. 4 is an exemplary view illustrating a schematic configuration of a vehicular display apparatus according to a modification of the embodiment.

Note that, in the embodiment described above, the magnifying mirror 5 may have a configuration in which the magnifying mirror 5 is fixed but moves rotationally. FIG. 4 is an exemplary view illustrating a schematic configuration of a vehicular display apparatus according to a modification of the embodiment. A vehicular display apparatus 1B according to the modification, as shown by a dotted line illustrated in FIG. 4, the direction of the optical path of the display light 14 is changed by rotationally moving the magnifying mirror 5, and then the position of the display image to be projected on the windshield 101 is vertically moved. For example, rotationally moving the magnifying mirror 5 according to the height of the driver 200 enables projection of the display image at a position at which the driver 200 visibly recognize with ease.

Additionally, in the embodiment described above, a subject to be projected by the display image is the windshield 101 of the vehicle 100. The object, however, is not limited to the windshield 101 and may be, for example, a combiner.

Moreover, in the embodiment described above, the magnifying mirror 5 is the aspherical mirror having the concave and aspherical reflecting surface 5a. The magnifying mirror 5, however, is not limited to the aspherical mirror and may be a spherical mirror of which reflecting surface 5a is concave and spherical.

Furthermore, in the embodiment described above, the turning back mirror 7 is the spherical mirror having the concave and spherical reflecting surface 7a. The turning back mirror 7, however, is not limited to the spherical mirror and may be an aspherical mirror which reflecting surface 7a is concave and aspherical. Furthermore, as described above, the turning back mirror 7 may have any configuration as long as the real image 21 corresponding to the display image of the display device 11 can be imaged, and may be an optical system including, for example, a convex mirror or a plurality of the lenses.

The vehicular display apparatus according to the embodiments causes a beneficial effect in terms of easy downsizing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display apparatus, comprising:
    a display device that emits display light corresponding to an display image to be visually recognized by a driver on a vehicle;
    a first reflecting mirror that reflects the display light to project, on a windshield of the vehicle, the display image; and
    a second reflecting mirror disposed on an optical path between the display device and the first reflecting mirror, and having a concave reflecting surface that reflects the display light, wherein
    the first reflecting mirror has magnifying power that is set higher than magnifying power of the second reflecting mirror, and
    when a distance between the second reflecting mirror and the display device is a and a focal distance of the second reflecting mirror is f, the second reflecting mirror is disposed at a position that satisfies the following expression: a>2f,
    the second reflecting mirror images a real image corresponding to the display image on the optical path away from the second reflecting mirror at a distance between the second reflecting mirror and the real image, defined as b, at a magnification b/a, and
    wherein the distance is measured perpendicular to the length of a display surface of the display device.

2. The vehicular display apparatus according to claim 1, wherein
    the second reflecting mirror has a reflecting surface having a spherical shape.

3. The vehicular display apparatus according to claim 1, wherein the second reflecting mirror has a reflecting surface having an aspherical shape.

4. The vehicular display apparatus according to claim 1, wherein the first reflecting mirror has magnifying power of five to six times.

5. The vehicular display apparatus according to claim 1, wherein the first reflecting mirror and the second reflecting mirror have a concave reflecting surface.

6. The vehicular display apparatus according to claim 1, wherein the first reflecting mirror moves rotationally according to the height of a driver.

* * * * *